United States Patent [19]

Leistner et al.

[11] 4,233,414
[45] Nov. 11, 1980

[54] POLYHYDRIC PHENOL COESTER STABILIZERS

[75] Inventors: William E. Leistner, Atlantic Beach, N.Y.; Motonobu Minagawa, Kosigaya, Japan; Yutaka Nakahara, Iwatsuki, Japan; Tohru Haruna, Okegawa, Japan

[73] Assignee: Argus Chemical Corporation, Brooklyn, N.Y.

[21] Appl. No.: 43,019

[22] Filed: May 29, 1979

Related U.S. Application Data

[62] Division of Ser. No. 740,110, Nov. 9, 1976, Pat. No. 4,174,297.

[51] Int. Cl.$^3$ .................. C08L 69/00; C08L 67/02; C08L 27/06
[52] U.S. Cl. ........................ 525/146; 260/9; 260/16; 260/45.7 R; 260/45.7 PH; 260/45.75 T; 260/45.75 N; 260/45.75 R; 260/45.75 W; 260/45.8 A; 260/45.85 H; 260/45.85 P; 260/45.85 S; 525/58; 525/400; 525/439
[58] Field of Search ................. 525/146, 58, 439; 260/45.85 P, 45.85 S

[56] References Cited

U.S. PATENT DOCUMENTS

| | | | |
|---|---|---|---|
| 3,030,331 | 4/1962 | Goldberg | 260/47 XA |
| 3,030,335 | 4/1962 | Goldberg | 260/47 XA |
| 3,169,121 | 1/1971 | Schnell | 260/47 XA |
| 4,032,510 | 6/1977 | Flood et al. | 260/45.85 S |

FOREIGN PATENT DOCUMENTS

| | | |
|---|---|---|
| 870095 | 6/1961 | United Kingdom . |
| 870096 | 6/1961 | United Kingdom . |
| 898775 | 6/1962 | United Kingdom . |
| 958798 | 5/1964 | United Kingdom . |

*Primary Examiner*—Theodore E. Pertilla
*Attorney, Agent, or Firm*—Otto S. Kauder

[57] ABSTRACT

New polyhydric phenol coesters are disclosed of polyhydric phenols, having 2 to 3 phenolic hydroxyl groups and 1 to 3 benzenoid rings, with carbonic acid and an aliphatic dicarboxylic acid having 4 to 10 carbon atoms and optionally a thioether sulfur atom in the aliphatic chain of the dicarboxylic acid. The new coesters have molecular weights from 700 to about 10,000, preferably from 1200 to 7000, and are highly effective stabilizers for a variety of synthetic resins.

Stabilizer compositions comprising a polyhydric phenol coester and a known polymer stabilizer, as well as synthetic resins stabilized with such stabilizer compositions, are also disclosed.

16 Claims, No Drawings

POLYHYDRIC PHENOL COESTER STABILIZERS

This is a division of application Ser. No. 740,110, filed Nov. 9, 1976 now U.S. Pat. No. 4,174,297.

BACKGROUND OF THE INVENTION

This invention relates to a new class of polyhydric phenol coesters and to synthetic resin stabilizer compositions comprising these coesters as well as to synthetic resins stabilized with such coesters and with stabilizer compositions comprising these coesters along with known polymer stabilizers.

The usefulness of phenols in stabilizer compositions for synthetic resins was recognized early in the development of polymer stabilization by additives, as disclosed for example by F. Duggan in U.S. Pat. No. 2,126,179 of Aug. 9, 1938, W. Leistner in U.S. Pat. No. 2,564,646 of Aug. 14, 1951, and W. Fischer in U.S. Pat. No. 2,625,521 of Jan. 13, 1953, in the stabilization of polyvinyl chloride resin compositions. Over the years, phenolic stabilizers have been used in an expanding variety of synthetic resins and an enormous number of disclosures of new phenolic stabilizers has accumulated. Rather than attempt to list every one of these disclosures, A. DiBattista in U.S. Pat. No. 3,824,192 of July 16, 1974 and M. Minagawa in U.S. Pat. No. 3,849,370 of Nov. 19, 1974 and in U.S. Pat. No. 3,869,423 of Mar. 4, 1975 are cited as summaries of a very large part of the existing art of phenolic stabilizers.

Phenolic stabilizers are also employed in conjunction with other stabilizers such as esters of thiodipropionic acid or organic phosphites in the stabilization of polypropylene and other synthetic resins against degradation upon heating or ageing under atmospheric conditions. Disclosures by C. Tholstrup, U.S. Pat. Nos. 3,033,814 of May 8, 1962 and 3,160,680 of Dec. 8, 1964; L. Rayner, U.S. Pat. No. 3,181,971 of May 4, 1965; D. Bown, U.S. Pat. No. 3,242,135 of Mar. 22, 1966; S. Murdock, U.S. Pat. No. 3,245,949 of Apr. 12, 1966; H. Hagemeyer, U.S. Pat. No. 3,282,890 of Nov. 1, 1966; J. Casey, U.S. Pat. No. 3,496,128 of Feb. 17, 1970 and U.S. Pat. No. 3,586,657 of June 22, 1971; M. Minagawa, U.S. Pat. No. 3,549,572 of Dec. 22, 1970, and U.S. Pat. Nos. 3,629,189 of Dec. 21, 1971, and 3,673,152 of June 27, 1972, U.S. Pat. Nos. 3,849,370 of Nov. 19, 1974 and 3,869,423 of Mar. 4, 1975; W. Drake U.S. Pat. No. 3,624,026 of Nov. 30, 1971; A. DiBattista, U.S. Pat. No. 3,824,192 of July 16, 1974; B. Cook, U.S. Pat. No. 3,850,877 and H. Mueller U.S. Pat. No. 3,850,918 of Nov. 26, 1974; M. Dexter U.S. Pat. No. 3,856,748 of Dec. 24, 1974, and U.S. Pat. No. 3,888,824 of June 10, 1975, and U.S. Pat. No. 3,903,160 of Sept. 2, 1975; P. Klemchuk of U.S. Pat. No. 3,860,558 of Jan. 14, 1975; M. Rasberger U.S. Pat. No. 3,867,340 of Feb. 18, 1975 and U.S. Pat. No. 3,901,931 of Aug. 26, 1975; H. Brunetti U.S. Pat. No. 3,867,337 of Feb. 18, 1975 and U.S. Pat. No. 3,873,498 of Mar. 25, 1975; S. Rosenberger U.S. Pat. No. 3,884,874 of May 20, 1975 and U.S. Pat. No. 3,887,518 of June 3, 1975; C. Ramey U.S. Pat. No. 3,907,803 of Sept. 23, 1975 are representative of a very large number of stabilizer combinations including dilauryl and distearyl thiodipropionate or other dialkyl thiodipropionates along with polyhydricphenols and sometimes organic phosphites, metallic stearates, ultraviolet absorbers, nickel compounds, and heavy metal deactivators for use in polypropylene and other polyolefins.

Disclosures by R. Werkheiser, U.S. Pat. No. 2,726,226 of Dec. 6, 1975; I. Salyer et al, U.S. Pat. No. 2,985,617 of May 23, 1961; L. Friedman, U.S. Pat. No. 3,039,993 of June 19, 1962; W. Nudenberg, U.S. Pat. No. 3,080,338 of Mar. 5, 1963; C. Fuchsman, U.S. Pat. No. 3,082,187 of Mar. 19, 1963; H. Orloff et al, U.S. Pat. No. 3,115,465 of Dec. 24, 1963; A. Nicholson, U.S. Pat. No. 3,167,526 of Jan. 26, 1965; A. Hecker et al, U.S. Pat. No. 3,149,093 of Sept. 15, 1964, U.S. Pat. No. 3,244,650 of Apr. 5, 1966 and U.S. Pat. Nos. 3,225,136 and 3,255,151 of June 7, 1966; C. Bawn, U.S. Pat. No. 3,352,820 of Nov. 14, 1967; D. Miller, U.S. Pat. No. 3,535,277 of Oct. 20, 1970; J. Casey, U.S. Pat. No. 3,586,657 of June 22, 1971; C. Abramoff U.S. Pat. No. 3,856,728 of Dec. 24, 1974; M. Minagawa, U.S. Pat. No. 3,869,423 of Mar. 4, 1975 and U.S. Pat. No. 3,907,517 of Sept. 23, 1975; and British Pat. Nos. 846,684, 851,670, and 866,883 are representative of stabilizer combinations including organic phosphites, polyhydric phenols, and other active ingredients.

As summarized in a publication by D. Plank and J. Floyd (title—"Polycarbonates: A New Concept in Stabilization for Polypropylene", meeting preprints, Society of Plastics Engineers, Houston, Tex., April 1975; pages 33–37), there have long been several problems with using phenols as stabilizers despite their widespread use. Many phenol stabilizers are volatilized out of the polymer at high use temperatures. Some phenol stabilizers are extractable under certain use conditions. The oxidative products of most phenols are highly colored, thus imparting a yellow color to the polymer. Many phenols are reactive towards acidic or basic residues in the polymer. Following are disclosures of suggested ways to overcome these problems.

L. Friedman has disclosed in U.S. Pat. No. 3,053,878 of Sept. 11, 1962 a class of linear phosphite polymers having the formula

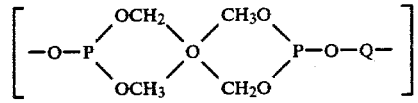

in which Q is the alkylene or arylene portion of a dihydric alcohol or dihydric phenol. R. Morris et al. in U.S. Pat. No. 3,112,286 of Nov. 26, 1963 disclosed phosphites having the formula

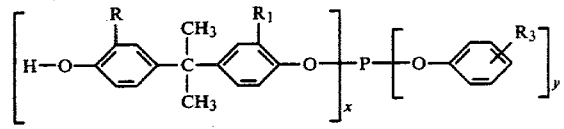

in which R represents a bulky hydrocarbon group such as t-butyl, t-amyl, t-hexyl, cyclohexyl, t-pentyl, t-octyl, phenyl, and the like: $R_1$ represents hydrogen and R; $R_3$ represents an alkyl group from 6 to 20 carbon atoms which is preferably in the meta or para position; x represents a number of from 1 to 3 inclusive; y represents a number of from 0 to 2 inclusive and the sum of the numerical value of x+y is always exactly 3.

D. Bown, U.S. Pat. No. 3,297,631 of Jan. 10, 1967 disclosed condensation products of phosphorus compounds with biphenols and trisphenols which may be represented by the structures:

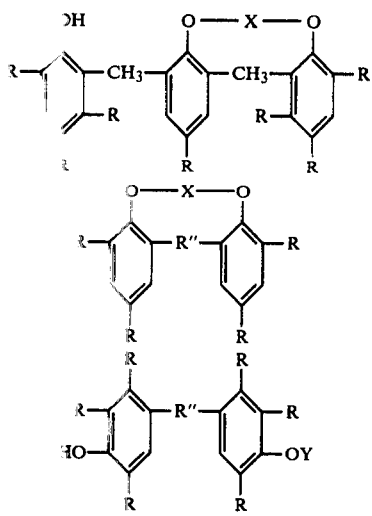

Where X is selected from the following:

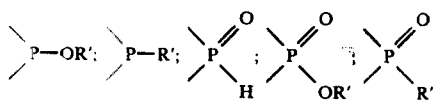

and Y is selected from the following: —P(OR')$_2$;

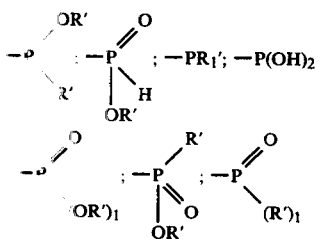

R is hydrogen, alkyl of 1 to 16 carbon atoms or aryl of a combination of these; R' is alkyl of 1 to 16 carbon atoms or aryl, anf R" is alkylidene of 1 to 16 carbon atoms or an aryl-substituted alkylidene.

C. Baranauckas, U.S. Pat. No. 3,305,608 of Feb. 21, 1967, disclosed phenolic phosphites useful as polymer stabilizers prepared by reacting a triorganophosphite, a polyol, and an aromatic material having two to six phenolic hydroxyl groups at 60°–180° C. in specified proportions.

G. Brindell, U.S. Pat. No. 3,412,064 of Nov. 19, 1968 disclosed phenolic phosphites represented by the general formula:

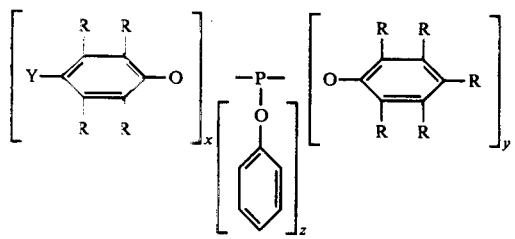

where x is from 1 to 3, y and z each from 0 to 2, x+y+z=3, R is hydrogen or alkyl and Y is hydroxyl or a group of the formula

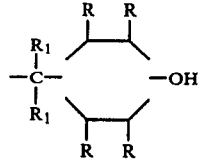

where R is hydrogen or alkyl

M. Larrison, U.S. Pat. No. 3,419,524 of Dec. 31, 1968, disclosed phosphites useful as polymer stabilizers having the formula:

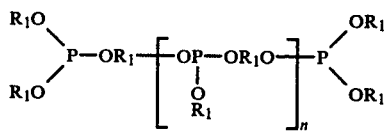

where $R_1$, $R_2$, $R_4$, $R_6$, and $R_7$ are aryl or haloryl, and $R_3$ and $R_5$ are a polyalkylidene glycol or an alkylidene bisphenol or a hydrogenated alkylidene bisphenol or a ring halogenated alkylidene bisphenol from which the two terminal hydrogens have been removed.

O. Kauder et al, U.S. Pat. No. 3,476,699 of Nov. 4, 1969 and U.S. Pat. No. 3,655,832 of Apr. 11, 1972 disclosed organic phosphites containing a free phenolic hydroxyl group and defined by the formula:

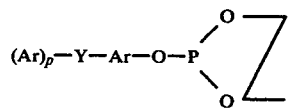

wherein Z is selected from the group consisting of hydrogen and aliphatic, cycloaliphatic, aromatic, heterocyclic and (Ar)$_p$—Y—Ar groups, taken in sufficient number to satisfy the valences of the two phosphite oxygen atoms; Y is a polyvalent linking group selected from the group consisting of oxygen; aliphatic, cycloaliphatic and aromatic hydrocarbon groups attached to each Ar group through a carbon atom not a member of an aromatic ring; oxyaliphatic; thioaliphatic, oxycycloaliphatic, thiocycloaliphatic; heterocyclic; oxyheterocyclic, thioheterocyclic, carbonyl, sulfinyl; and sulfonyl groups; Ar is a phenolic nucleus which can be phenyl or a polycarbocyclic group having condensed or separate phenyl rings; each Ar group is either connected through an oxygen atom to a phosphite group or contains a free phenolic hydroxyl group, or both; and p is a number, one or greater, and preferably from one to four, which defines the number of Ar groups linked to Y.

L. Friedman, U.S. Pat. No. 3,516,963 of June 23, 1970, disclosed phosphites having the formula:

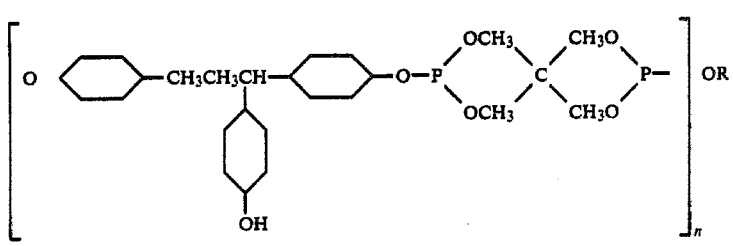

where R is alkyl, alkenyl, aryl, aralkyl, haloaryl, haloalkyl or

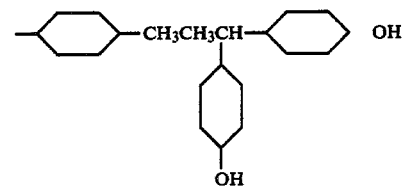

and n is an integer of at least 1, n can be 2, 3, 4, 5, 6, 7, 8, 10, 50, 100 or even more.

D. Bown et al. in U.S. Pat. No. 3,510,507 of May 5, 1970 and U.S. Pat. No. 3,691,132 of Sept. 12, 1972 disclosed polyolefins stabilized with polyphosphites, polyphosphates, polyphosphonites, polyphosphonates, polyborates, polycarbonates, and polysilanes which are condensation products of a 4,4′-bisphenol with a condensing or linking agent which may be of the ester type, such as the esters of triaryl or mixed aryl-alkyl compounds, or the acid halide type. Bown's condensation product stabilizers have molecular weights between 600 and 8000 or higher and are described by the structural formula,

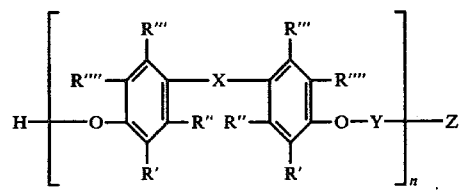

where X is selected from the group consisting of

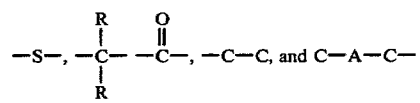

where A is a $C_1$ to $C_{16}$ alkylene or an arylene; R′, R″, R‴, and R″″ are selected from the group consisting of hydrogen, $C_1$ to $C_{18}$ alkyls, and an aryl group; Y is selected from the group of

where R is hydrogen, a $C_1$ to $C_{18}$ alkyl, or aryl;

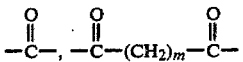

where m is 0 to 10, preferably 4 to 8,

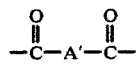

where A′ is $(CH_2)_n$—S—$(CH_2)_n$ or —$(CH_2)_n$—S—$(CH_2)_m$—S—$(CH_2)_n$ where n is 0 to 10, preferably 2 and m is 0 to 10, preferably 5;

$$-\underset{\underset{R}{|}}{\overset{\overset{R}{|}}{Si}}- \text{ and } -\underset{\underset{R}{|}}{\overset{\overset{R}{|}}{Si}}-O-\underset{\underset{R}{|}}{\overset{\overset{R}{|}}{Si}}-$$

where R is an alkyl, preferably methyl, and Z is

where R′, R″, R‴, R″″, and X correspond respectively to the R′, R″, R‴, R″″, and X previously selected when n has a value from 1 to 15, or Z may be derived from the compound used to introduce Y into the product when n has a value from 2 to 15, for example —R or —OR where R is hydrogen, an alkyl, or aryl. When Y in the formula of Bown's stabilizer is $$-\underset{\underset{OR}{|}}{P}-,$$

the stabilizer is a type of hydroxyaryl phosphite. Similarly, when Y in the formula is

the stabilizer is a hydroxyaryl carbonate.

Brown's condensation products are described as especially effective in high molecular weight solid polyolefins when used together with a dialkyl sulfide costabilizer such as dilauryl thiodipropionate, distearyl thiodipropionate, ditridecyl thiodipropionate, dicetyl sulfide, bis(tetradecylmercapto) paraxylylene, and 10,24-dithiotetracontane. J. Floyd et al in German published application No. 2505071 of Aug. 14, 1975 abstracted in Chemical Abstracts 1976, Volume 84, abstract no. 5945f, disclosed low molecular weight polycarbonate esters of bisphenols such as 2,2-bis(3-t-butyl-4-hydroxyphenylpropane) and 4,4'-butylidene bis(6-t-butyl-3-methylphenol) prepared in such a way as to contain few or no free phenolic hydroxyl groups as being highly effective heat and light stabilizers for polyolefins and giving a synergistic effect with distearyl thiodipropionate, tris (nonylphenyl) phosphite, and distearyl pentaerythritoldiphosphite.

D. Plank and J. Floyd in the 1975 publication already cited have disclosed two general synthetic procedures for preparing stabilizer polycarbonates. They may be obtained by direct phosgenation of a bisphenol either in methylene chloride with pyridine as a catalyst or directly in pyridine. Using this procedure, a typical product obtained has the following formula.

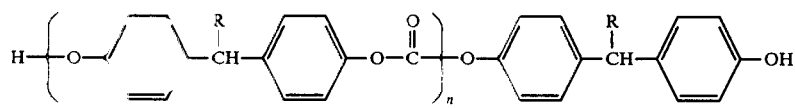

The authors did not state the nature of R or a value of n but did indicate that the molecular weight can be controlled easily by adding a modifier to the reaction mixture. The nature of the modifier is not mentioned. The authors disclosed a range of molecular weights from 680 to 1952, with the highest molecular weight products providing the longest 150° C. oven life in polypropylene also containing a thioester, distearyl thiodipropionate. The authors stated that when used alone, two products within their class of polycarbonates are not effective stabilizers, but they formed a very effective stabilizing system in combination with a thioester.

In other disclosures of polyhydric phenol carbonate ester additives to synthetic resin compositions, H. Peters in German Pat. No. 1,146,251 of Mar. 28, 1963 improved mechanical properties of polyolefins by adding 0.5 to 50% 2,2bis(4-hydroxyphenylpropane) carbonic acid polyester. T. Saito in U.S. Pat. No 3,364,281 of Jan. 16, 1968 disclosed polyolefin fibers of improved dyeability containing 1 to 20% of polymeric additive which can be a high molecular weight polyhydric phenol carbonate. Solvay et Cie. in British Pat. No. 1,135,976 of Dec. 11, 1968 has disclosed the use of a high molecular weight bis(hydroxyphenyl) propane-phosgene condensation product as an adjunct to the polymerization initiator for the polymerization of ethylene. I. Ouchi in Japanese Pat. No. 69-21,676 of Sept. 16, 1969 improved the smoothness of polyethylene terephthalate film by incorporating a small percentage of polycarbonate. Z. Opritz in U.S.S.R. Pat. No. 314,827 of Sept. 21, 1971 disclosed improved heat resistance of polyamides prepared from amino acids or lactams by addition of up to 10% of a polycarbonate having a formula $(OC_6H_4RC_6H_4O_2C)_x$ where R is $CH_2$, $CMe_2$, or $C(C_nH_{2n+1})_2$. Y. Umezawa in Japanese Kokai 72-34,744 of Nov. 22, 1972 disclosed styreneacrylonitrile copolymer compositions having improved moldability and mechanical properties with 5 to 40% polycarbonate resin. None of these disclosures relates to a coester of a polyhydric phenol with carbonic acid and a dicarboxylic acid or to a carbonate ester of molecular weight less than 10,000.

Carbonate esters and carbonate-dicarboxylic acid coesters of polyhydric phenols are known in the form of high molecular weight materials that are useful as films, fibers, molded or extruded parts and surface coatings for use in structural, decorative and electrical applications. The extensive literature has been reviewed by L. Bottenbruch in "Encyclopedia of Polymer Science and Technology" (N. Bikales, ed.) Volume 10, pages 710–764 (J. Wiley—Interscience Publishers, New York 1969). High molecular weight coesters including aliphatic dicarboxylic acids in the polymer chain with polyhydric phenol carbonates have been disclosed by E. Goldberg, in U.S. Pat. Nos. 3,020,331 and 3,030,335 of Apr. 17, 1962, U.S. Pat. No. 3,161,615 of Dec. 15, 1964, U.S. Pat. No. 3,169,121 of Feb. 9, 1965, and U.S. Pat. No. 3,207,814 of Sept. 21, 1965, N. Reinking in U.S. Pat. No. 3,166,606 of Jan. 19, 1965 and H. Schnell in U.S. Pat. No. 3,553,167 of Jan. 5, 1971.

SUMMARY OF THE INVENTION

In accordance with this invention, new polyhydric phenol coesters of polyhydric phenols having 2 to 3 phenolic hydroxyl groups and 1 to 3 benzenoid rings with carbonic acid and an aliphatic dicarboxylic acid having 4 to 10 carbon atoms and optionally a thioether sulfur atom in the aliphatic chain of atoms comprising the two carboxyl groups are prepared. The coesters have molecular weights ranging from 700 to about 10,000, preferably from 1200 to about 7000 for highest effectiveness as ingredients of stabilizer compositions for synthetic resins. The molar proportions of aliphatic dicarboxylic acid to the carbonic acid in the coester range from 19:1 to 1:19, preferably from 4:1 to 1:4. The coesters of the invention can contain a single polyhydric phenol or a plurality of polyhydric phenols as well as a single dicarboxylic acid or a plurality of aliphatic dicarboxylic acids.

Synthetic resin stabilizer compositions comprising the coesters of this invention contain at least one known polymer stabilizer along with one or more coesters according to this invention. The proportions of coester to known polymer stabilizer in such stabilizer compositions can range from 1 to 1 to about 1 to 30 by weight.

DESCRIPTION OF THE PREFERRED EMBODIMENTS

Essential to the achievement of the unexpected effectiveness in resin stabilizer compositions of the coesters of this invention are the combined aliphatic-aromatic structure and controlled molecular weight of the polyhydric phenol dicarboxylic acid and carbonic acid coesters. The result from these essential features a minimal volatility and leachability so that the stabilizing effectiveness manifested by the coesters is maintained over long periods of time when resin compositions stabilized with the coesters are exposed to the action of air, water, and chemical solutions at an elevated temperature.

The polyhydric phenol dicarboxylate-carbonate coesters of this invention are derived from carbonic acid, introduced into the molecule by a carbonylating agent such as an ester or acid chloride of carbonic acid; an aliphatic dicarboxylic acid having 4 to 10 carbon atoms and optionally a thioether group, introduced into the molecule by way of an ester or acid chloride of the dicarboxylic acid; and a polyhydric phenol having two to three hydroxyl groups and one to three benzenoid rings which can each be substituted with up to three alkyl, cycloalkyl, or aralkyl groups having 1 to 10 carbon atoms. For reasons that are not well understood the greatest stabilizing effectiveness is associated with aliphatic dicarboxylic acid—carbonic acid coesters of polyhydric phenols having an odd number of benzenoid rings in the polyhydric phenol.

The polyhydric phenol carbonate-dicarboxylate coesters of this invention re crystalline powders or grindable glassy solids which are derived from an aliphatic dicarboxylic acid having two carboxylic acid groups on an aliphatic carbon atom chain that can be interrupted by a thioether sulfur atom. The dicarboxylic acid can be saturated or unsaturated. Lower alkyl and lower alkylthio group substitutents can be present along the aliphatic chain of the dicarboxylic acid. Useful dicarboxylic acids from which the coesters of this invention can be derived include fumaric acid, acetylenedicarboxylic acid, succinic acid, methylsuccinic acid, methylthiosuccinic acid, itaconic acid, mesaconic acid, glutaric acid, 2,2'-thiodiacetic acid, 2,2'-, 2,3'-, and 3,3'-thiodipropionic acids, 3-(S-carboxymethylthiopropionic acid), 3-(S-carboxymethyl)thio-2-methylpropionic acid, 3-methylglutaric acid, muconic acid, adipic acid, pimelic acid, suberic acid, 4,4'-thiodibutyric acid, 2-ethyladipic acid, 2,5-diethyl-adipic acid, azelaic acid, and sebacic acid. Saturated, unbranched aliphatic dicarboxylic acids are preferred.

A preferred class of polyhydric phenol carbonate-dicarboxylate coesters of this invention is derived from ortho-substituted 1,3- and 1,4-dihydric phenols having one benzenoid ring such as 2,5-di-t-butyl-hydroquinone, 2,3,6-trimethylhydroquinone, 2-methyl-resorcinol, and 2,6-di-t-butylresorcinol.

Also useful polyhydric phenol carbonate-dicarboxylate coesters are coesters of ortho-substituted bisphenols having two ortho-substituted phenolic groups linked directly or through a two valent hydrocarbon group such as 2,2'-methylene bis(4-methyl-6-t-butyl-phenol), 2,2'-methylene bis(4-ethyl-6-t-butyl-phenol), 2,2'-methylene bis(4-methyl-6-(1-methylcyclohexyl)-phenol), 2,2'-n-butylidene bis(4,6-dimethylphenol), bis-1,1-(2'-hydroxy-3',5'-dimethylphenyl)-3,5,5-trimethylhexane, 2,2'-cyclohexylidene bis (4-ethyl-6-t-butyl-phenol), 4,4'-bis(2,6-di-t-butylphenol), 4,4'-methylene bis(2,6-di-t-butylphenol), 4,4'-isopropylidene bis(2-phenylethylphenol), 4,4'-n-butylidene bis(3-methyl-6-t-butylphenol), 4,4'-cyclohexylidene bis(2-t-butylphenol), 4,4'-cyclohexylidene bis(2-cyclohexylphenol), and 4,4'-benzylidene bis(2-t-butyl-5-methylphenol).

Another preferred class of polyhydric phenol carbonate-dicarboxylate coesters provided in accordance with this invention is the class of carbonate coesters of ortho-substituted bisphenols having two ortho-substituted phenolic groups linked through oxygen or sulfur, such as 4,4'-oxobis(3-methyl-6-isopropylphenol), 4,4'-thiobis(2-methyl-6-t-butyl phenol), 4,4'-thiobis(3-methyl-6-t-butylphenol), 4,4'-sulfobis(3-methyl-6-t-butylphenol), bis(2-methyl-4-hydroxy-5-t-butylbenzyl) sulfide, bis(3,5-di-t-butyl-4-hydroxy benzyl) sulfide, 2,2'-thiobis(4-t-butyl-6-methylphenol), 2,2'-thiobis(4-methyl-6-t-butyl-phenol), and 2,2'-thiobis(4,6-di-t-butylphenol). A particularly preferred class of polyhydric phenol carbonate-dicarboxylate coesters is the class of carbonate coesters of ortho-substituted trisphenols having three ortho-substituted phenolic groups, such as 1,1,3-tris(2'methyl-4'-hydroxy-5'-t-butylphenyl)butane, 1,3,5-tris(3',5'-di-t-butyl-4'-hydroxybenzyl)-2,4,6-trimethylbenzene, 2,2-bis(3'-t-butyl-4'-hydroxyphenyl)-4-(3'',5''-di-t-butyl-4''-hydroxyphenyl)butane, and 2,2-bis(2-'methyl-5-t-butyl-4'-hydroxyphenyl)-4-(3'',5''-di-t-butyl-4'''-hydroxyphenyl) butane.

The most preferred group of carbonate coesters used in stabilizer compositions of this invention is defined by the formula

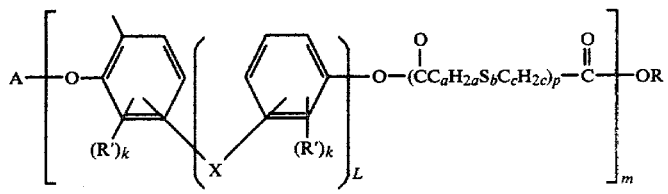

in which independently at each occurrence R' is selected from the group consisting of alkyl, cycloalkyl or arylalkyl radicals, A is selected from the group consisting of hydrogen and

R is selected from the group consisting of alkyl, aryl, and

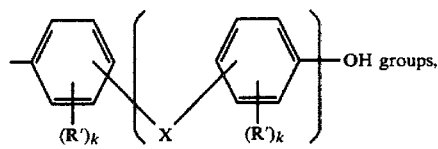 OH groups,

X is selected from the group consisting of

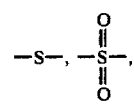

—CH$_2$SCH$_2$—, O, a single bond, a divalent hydrocarbon radical, and

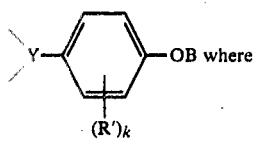

Y is a trivalent hydrocarbon radical, B is a hydrogen atom or the group

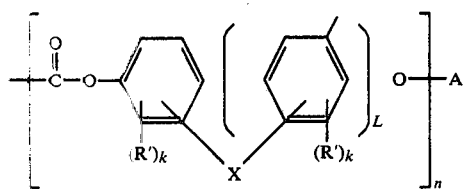

L is 0 or 1, k is an integer from 0 to 3, m is 2 to about 20, n is an average of 0.1 to about 20, a and c are integers from 1 to 7, b is 0 or 1, and p is 0 or 1 provided that p is 1 in at least one occurrence. X groups and alkyl groups R',R have 1 to 10 carbon atoms; cycloalkyl R and R' groups have 5 to 10 carbon atoms and aralkyl groups R and R' have 7 to 10 carbon atoms; trivalent Y groups have 2 to 10 carbon atoms.

The polyhydric phenol dicarboxylate carbonate coesters of this invention can be prepared by the reaction of a carbonylating agent such as phosgene, a chloroformate ester, a dialkyl carbonate or a diaryl carbonate with an alkylenedicarboxylic acid compound and a substituted dihydric or trihydric phenol in one or several reaction stages. Acid acceptors such as ammonia, pyridine, organic amines, and inorganic alkalies can be used with phosgene and chloroformate esters, and acidic or alkaline transesterification catalysts can facilitate the reaction of alkyl and aryl carbonate esters. The molecular weight of the coester is regulated by the proportions of dicarboxylic acid acid compound and carbonylating agent to dihydric or trihydric phenol. The more closely the proportions of the combined dicarboxylic acid and carbonylating agent to dihydric or trihydric phenol approach one to one compound equivalent of each reactant the higher the molecular weight of the resulting product.

Conversely, either reactant can be used in large excess to prepare products having nearly the lowest molecular weight possible, that is a coester having a single carbonate ester, group, a single dicarboxylic acid ester group, and the minimum number of polyhydric phenol groups to link these together. Thus the product of the reaction between two moles of a dihydric phenol and one mole of carbonylating agent is a relatively low molecular weight mixture of carbonate esters in which the bis(hydroxyaryl carbonate) of the dihydric phenol predominates, and the product of the reaction between two moles of a carbonate ester carbonylating agent (e.g. diphenyl carbonate) and one mole of dihydric phenol is a relatively low molecular weight mixture of carbonate esters in which the dihydric phenol bis(phenyl carbonate) ester predominates.

Each of these products can then be used to prepare a coester of this invention by reaction with an appropriate aliphatic dicarboxylic acid compound. Thus the above bis(hydroxyaryl) carbonate ester of the polyhydric phenol can be caused to condense with the acid chloride or diphenyl ester of an aliphatic dicarboxylic acid, with elimination of hydrogen chloride or phenol as side product respectively, to give a carbonate-dicarboxylate coester with a molecular weight depending on the relative proportions of reactants. Similarly, a polyhydric phenol phenyl carbonate ester can be transesterified with a hydroxyaryl ester of an aliphatic dicarboxylate to displace phenol and give a carbonate-dicarboxylate coester of the polyhydric phenol present in each of the starting materials, which means that the coester can be made up of different polyhydric phenols if each of the starting materials contains a different polyhydric phenol. Both techniques just described are essentially two stage reaction techniques that yield coesters of a relatively ordered structure in which polyhydric phenol groups are alternatingly linked through carbonate ester groups and through aliphatic dicarboxylic acid ester groups. Coesters prepared at elevated temperature, such as by the phenyl ester transesterification technique, have the ordered alternating structure modified to a minor extent as a result of ester-ester interchange randomization. All these reactions can be illustrated by equations in which for convenience the symbols HO—Ar—OH and HO—Ar'—OH are used for the polyhydric phenols that can be used according to this invention, and PhOCO—D—COOPh and ClCO—D—COCl represent any of the phenyl esters and acid chlorides of aliphatic dicarboxylic acids that can be used.

A. Condensation of hydroxyaryl carbonate with dicarboxylic acid compound:

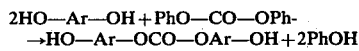
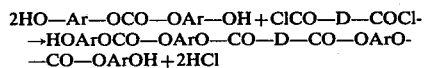

B. Condensation of phenyl carbonate of polyhydric phenol with dicarboxylate of a different polyhydric phenol:

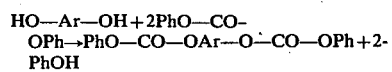

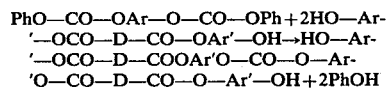

C. Ester interchange randomization:

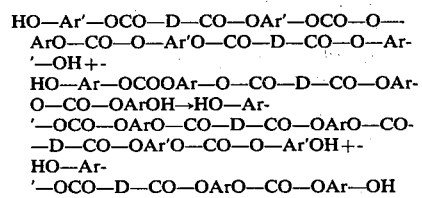

Coesters of this invention can also be prepared in a single reaction step leading to a random arrangement of carbonic acid ester and dicarboxylic acid ester groups in the structure of the coester. Thus the polyhydric phenol (or mixture of more than one polyhydric phenols) can be heated with a mixture of diphenyl carbonate and aliphatic dicarboxylic acid diphenyl ester with removal of the side-product phenol. Alternatively, the polyhydric phenol (or mixture of polyhydric phenols) can be reacted, suitably dissolved in an inert solvent such as toluene, methylene chloride or trichloroethylene, with a mixture of aliphatic dicarboxylic acid dichloride and carbonyl chloride ($COCl_2$) or a polyhydric phenol chlorocarbonate ester $Ar(OCOCl)_{2-3}$ with elimination of by-product hydrogen chloride by reaction with an acid acceptor which can be an organic amine dissolved in the reaction solution, a suspension of an inorganic alkali, or an aqueous solution of an inorganic alkali.

Both the phenyl ester reaction and the acid chloride reaction can be facilitated by the use of catalysts. The phenyl ester reaction is suitably catalyzed by substances of sufficient alkalinity to convert phenol at least in part to the phenoxide ion, such as alkali and alkaline earth metals and their oxides, hydroxides, sulfides, cyanides, phenolates, hydrides, alcoholates, and carboxylates as well as aliphatic and cycloaliphatic amines, preferably tertiary amines to avoid the possible complication of amide formation. Suitable catalysts for the acid chloride reaction include tertiary amines, tertiary phosphines, and the hydrogen halide and alkyl halide addition salts thereof. Catalyst concentrations usefully range from 0.01% to about 5% by weight of reaction mixture. Preferred catalysts for the acid chloride reaction have the ability to partition between water and an immiscible hydrocarbon phase with a partition coefficient between 0.01 and 100.

Both the phenyl ester reaction method of preparing the coester of this invention and the acid chloride method can be carried out over a convenient range of reaction temperatures. The phenyl ester reaction is conveniently carried out at elevated temperatures of the order of 80° to 210° C. with removal of the side product phenol by distillation, suitably under diminished pressure. It is frequently helpful to begin the reaction by an atmospheric pressure cook, suitably with nitrogen or other inert gas protection over the reaction mass to preserve its light color, and apply vacuum gradually after a quantity of side product has accumulated for removal.

The acid chloride reaction is conveniently carried out at ambient temperatures or as cold as −15° C. Elevated temperatures in the 40° to 90° C. range can also be used.

In coesters prepared with an excess of equivalents of the dihydric or trihydric phenol reactant over the equivalents of carbonylating agent and dicarboxylic acid compound combined, the coester is predominantly terminated by hydroxyaryl groups, while in coesters prepared with an excess of the combined equivalents of dicarboxylic acid compound and carbonylating agent over the phenol, ester termination predominates. The hydroxyaryl terminated coesters having an average molecular weight ranging from 700 to about 10000 & especially with a molecular weight ranging from 1200 to about 7000 are preferred.

Synthetic resins that can be stabilized with compositions comprising a polyhydric phenol and aliphatic dicarboxylate carbonate coester according to this invention include alphaolefin polymers such as polyethylene, polypropylene, polybutene, poly-3-methylbutene, or copolymers thereof such as ethylenevinylacetate copolymer, ethylenepropylene copolymer, polystyrene, polyvinylacetate, acrylic ester resins, copolymers from styrene and another monomer (for example, maleic anhydride, butadiene, acrylonitrile and so on), acrylonitrile-butadiene-styrene copolymer, acrylic acid ester-butadiene-styrene copolymer, methacrylic acid ester-butadiene-styrene copolymer, methacrylate ester resin such as polymethylmethacrylate, polyvinylalcohol, ethylene and butylene terephthalate polyesters, polyamide, polycarbonate, polyacetal, polyurethane, cellulosic resin, or phenolic resin, urea resin, melamine resin, epoxy resin, unsaturated polyester, silicone resin, halogen-containing resin such as polyvinyl chloride, polyvinylidene chloride, polyvinylidene fluoride and copolymers thereof, and further rubbers such as isoprene rubber, chloroprene rubber, and blends of the above resins.

Stabilizer compositions comprising a polyhydric phenol dicarboxylatecarbonate coester according to this invention can be formulated and marketed in liquid, solid, and paste forms. An inert solvent can be used to facilitate handling. The polyhydricphenol coester and known polymer stabilizers can also be solubilized in one another by heating, such as at 70°–160° C. for up to 4 hours, and then allowing the resulting melt to cool and harden sufficiently to be flaked and ground.

Known polymer stabilizers can be used in synthetic resin compositions together with the coester stabilizers of this invention and can be admixed with the latter. Such stabilizers include thiodipropionic acid esters, polyvalent metal salts of carboxylic acids, organic phosphites, 1,2-epoxides, polyhydric alcohols, polyhydric alcohol 3-alkylthiopropionic acid esters, ultraviolet absorbers and heavy metal deactivators. Representative thiodipropionic acid esters include di-n-dodecyl thiodipropionate, dihexadecyl thiodipropionate, distearyl thiodipropionate, n-octyl eicosanyl thiodipropionate and n-octadecyl cyclohexane-1,4-dimethanol thiodipropionate polyester. A comprehensive disclosure of useful thiodipropionate esters by M. Minagawa et al in U.S. Pat. No. 3,869,423, column 17 line 55 to column 19 line 54 is here incorporated by reference. When thiodipropionate esters are used the concentration based on 100 parts of polymer can range from 0.05 to about 0.75 parts by weight.

Representative polyvalent metal salts include zinc, calcium, magnesium, barium, strontium and nickel salts of monocarboxylic acids having 6 to 24 carbon atoms, for example zinc benzoate, calcium palmitate, and nickel 2-ethylbutyrate. A comprehensive disclosure of useful metal salts by M. Minagawa et al. in U.S. Pat. No. 3,869,423, column 19 line 56 column 20 line 35 is here incorporated by reference. When metal salts are used the concentration based on 100 parts by weight of polymer can range from 0.1 to about 3 parts by weight.

Representative organic phosphites include triisodecylphosphite, tris(nonylphenyl phosphite), and 4,4'-isopropylidene diphenol alkyl ($C_{12}$–$C_{15}$) phosphite. A comprehensive disclosure of useful organic phosphites by M. Minagawa in U.S. Pat. No. 3,849,370 column 13 line 63 to column 16 line 48 is here incorporated by reference. Typical use concentrations of organic phosphites are in the range from 0.02 part to about 2 parts by weight per 100 parts of polymer being stabilized.

Representative 1,2-epoxides that can be used in stabilizer compositions according to this invention include epoxysoybean oil, epoxylinseed oil, and 2-ethylhexyl epoxystearate. A comprehensive disclosure of 1,2-epoxides by M. Minagawa et al in U.S. Pat. No. 3,869,423 column 26 line 13 to line 39 is here incorporated by reference. Typical use concentrations of 1,2-epoxides range from 0.3 to about 6 parts by weight per 100 parts of synthetic resin composition.

Aliphatic polyhydroxy compounds can be included with stabilizer compositions of this invention in amounts corresponding to 0.1 to about 1 part per 100 parts of polymer being stabilized. Typical aliphatic polyhydroxy compounds are glycerol, polyglycerol, mono- di-, and tri-pentaerythritol, mannitol, sorbitol, and partial esters of these with saturated and unsaturated fatty acids having 6 to 22 carbon atoms.

3-Alkylthiodipropionates of polyhydric alcohols can be included in stabilizer compositions of this invention in amounts corresponding to 0.02 to about 1 part per 100 parts of synthetic resin being stabilized. The propionate esters have 4 to about 34 carbon atoms in the alkylthiodipropionate group, 2 to about 15 carbon atoms in the polyhydric alcohol group and 2 to about 8 ester groups in the molecule. Representative propionate esters are 2,2-dimethylpropanediol bis(3-n-dodecylthio-2-methylpropionate), pentaerythritol tetrakis(3-n-octylthiopropionate) and tris(3-n-octadecylthiopropionyloxyethyl)isocyanurate. For a further listing of useful 3-alkylthiopropionates the disclosure of A. Onishi U.S. Pat. No. 3,629,194 can be consulted.

Ultraviolet absorbers can be included in stabilizer compositions of this invention in amounts corresponding to 0.05 to about 1 part per 100 parts of synthetic resin being protected. Typical ultraviolet absorbers are 2-hydroxybenzophenones such as 2-hydroxy-4-n-octyloxybenzophenone and 2,4-dihydroxybenzophenone, and 2-(2'hydroxyphenyl)benzotriazoles such as 2-(2'-hydroxy-5'-methylphenylbenzotriazole and 2-(2'-hydroxy-5'-t-butylphenyl) 5,6-dichlorobenzotriazole. For a further listing of many useful ultraviolet absorbers the disclosure of U.S. Pat. No. 3,395,112 of July 30, 1968, particularly column 14 line 40 to column 19 line 33, can be consulted. Stabilizer compositions according to this invention that protect synthetic resin compositions used in contact with materials containing heavy metals and their compounds, as in insulating materials for copper based electrical conductors or in compositions pigmented with heavy metal containing pigments such as rouge, talc, and iron-bearing asbestos, can contain heavy metal deactivators that counteract the prodegradant effect of the heavy metal on synthetic resin compositions that would be satisfactorily stabilized in the absence of heavy metal. Heavy metal deactivators that can be used in stabilizer compositions according to this invention include melamine, dicyandiamide, oxanilide, N,N'-disalicyloylhydrazine, 3-salicyloylamido-1,2,4-triazole, as well as the heavy metal deactivators disclosed by M. Minagawa in U.S. Pat. No. 3,549,572 (column 5 line 19 to column 10 line 23), U.S. Pat. No. 3,629,181 (column 5 line 15 to column 9 line 54), U.S. Pat. No. 3,673,152 (column 4 line 47 to column 8 line 62), and U.S. Pat. No. 3,849,370 (column 5 line 5 to column 13 line 45). These disclosures are here incorporated by reference.

Illustrative of stabilizer compositions comprising coesters of polyhydric phenols with carbonic acid and an aliphatic dicarboxylic acid according to this invention together with known polymer stabilizers are the following:

| STABILIZER COMPOSITION | INGREDIENTS | PARTS BY WEIGHT |
|---|---|---|
| I | 2:1 (molar ratio) carbonate/adipate of 4,4'-butylidenebis(3-methyl-6-t-butylphenol), approx. mol. wt. 1400 | 10 |
| | Zinc Stearate | 20 |
| | Magnesium benzoate | 15 |
| | Mannitol | 25 |
| II | 2:3 carbonate/azelate of bis(3-methyl-4-hydroxy-5-t-butylbenzyl) sulfide, approx. mol. wt. 1900 | 12 |
| | Barium nonylphenolate | 30 |
| | Zinc 2-ethylhexoate | 18 |
| | Diphenyl isodecyl phosphite | 40 |
| III | 2:5 carbonate/thiodiacetate of 2,3,5-trimethyl-hydroquinone, approx. mol. wt. 2900 | 25 |
| | 2-ethylhexyl epoxystearate | 45 |
| | tris(nonylphenyl) phosphite | 30 |
| IV | 4:3 carbonate/fumarate of 4,4'-isopropyl-idenediphenol, approx. mol. wt. 2400 | 10 |
| | Strontium laurate | 80 |
| | Zinc laurate | 40 |
| | Dipentaerythritol | 15 |
| V | 1:1 carbonate/methylsuccinate of 2,2'-methylenebis(4,6-di-t-butylphenol), approx. mol. wt. 900 | 25 |
| | Distearyl thiodipropionate | 45 |
| | Trihexadecyl phosphite | 10 |
| VI | 2:1 carbonate/n-butylthiosuccinate of t-butylhydroquinone, approx. mol wt. 4600 | 60 |
| | Dicyandiamide | 40 |
| VII | 3:1 carbonate/sebacate of 4,4'-thiobis(2-t-butyl-5-methylphenol), approx. mol wt. 3300 | 15 |
| | Pentaerythritol bis(n-octadecyl phosphite) | 6 |
| VIII | 1:1 carbonate/pimelate of 1,1,3-tris(2'-methyl-4'-hydroxy-5'-t-butane, approx. mol. wt. 2200 | 15 |
| | Trimethylolpropane tris(3-isotridecylthiopropionate | 55 |
| | 2(2'-hydroxy-5'-methylphenyl)benzotriazole | 15 |
| IX | 3:2-carbonate/3,3'-thiodipropionate of 4,4'-cyclohexylidenebis(2-t-butylphenol), approx. mol. wt. 5600 | 32 |
| | di-isotridecylthiodipropionate | 20 |
| | Calcium myristate | 28 |
| | N,N'-disalicyloylhydrazine | 20 |

The preparation of the stabilized resin composition is easily accomplished by conventional procedures. A heated two roll mill, for example, is a convenient compounding tool for blending stabilizer compositions of the invention with polyolefins, vinyl chloride polymers, ABS polymers, ethylene-vinyl acetate copolymers and others.

The Examples that follow illustrate the invention without limiting its scope. Examples 1 through 28 describe the preparation of different polyhydric phenol dicarboxylic acid and carbonic ester coesters of this invention by several of the techniques disclosed above. Examples 29 through 93 illustrate the use of coester stabilizers of this invention and stabilizer compositions comprising coesters of this invention in the stabilization of olefin polymers, a vinyl chloride polymer an ABS polymer, and a polyamide.

EXAMPLES 1-5

Thiodipropionic acid diphenyl ester 13.2 g (0.04 mole), 4,4'-butylidenebis(3-methyl-6-t-butylphenol) 30.6 g (0.08 mole) and sodium methoxide 0.04 g were heated to 150° C. under the nitrogen atmosphere. Then, reaction was carried out for 5 hours while distilling out phenol under reduced pressure (3 mm Hg). The quantity of phenol distillate was 7.7 g representing 103% of the calculated quantity.

Diphenylcarbonate 6.4 g (0.03 mole) and potassium carbonate 0.04 g were added and reacted at 145° C. for 3 hours under a nitrogen atmosphere, and then for 3 hours under reduced pressure while distilling out phenol, 5.8 g or 102% of the calculated quantity.

A glassy solid of m.p. 95°–102° C., molecular weight 3720 was obtained (stabilizer No. 1). The molecular weight was measured by a vapor pressure method.

The following polyhydric phenol coester compounds in Table 1 were obtained by the same procedure as Example 1 by varying the aliphatic dicarboxylic acid diphenyl ester and polyhydric phenol reactants.

were added and reacted at 140° C. for 3 hours under nitrogen and then 2 hours more under reduced pressure (3 mm Hg) while distilling out phenol 1.8 g or 95% of the calculated quantity.

A light yellow glassy solid of m.p. 72°–80° C., m.w. 2490 was obtained. (stabilizer No. 6).

In the same way as Example 6, the compounds obtained by varying the dicarboxylic acid dichloride and polyhydric phenol are shown in Table 2.

TABLE 2

| STABILIZER No. | DICARBOXYLIC ACID DICHLORIDE | POLYHYDRIC PHENOL | MELTING POINT | MOLECULAR WEIGHT |
|---|---|---|---|---|
| 7 | Thiodipropionic acid dichloride | 4,4'-cyclohexylidene bisphenol | 86°–90° C. | 1,390 |
| 8 | Sebacic acid dichloride | 4,4'-butylidene bis (3-methyl-6-t-butylphenol) | 65–73 | 1,890 |
| 9 | Succinic acid dichloride | 4,4'-butylidene bis (3-methyl-6-t-butylphenol) | 83–91 | 1,720 |
| 10 | Sebacic acid dichloride | 4,4'-thiobis(3-methyl-6-t-butyl-phenol) | 64–73 | 2,000 |
| 11 | Adipic acid dichloride | 1,1,3-tris(2'-methyl-4'-hydroxy-5'-t-butylphenyl) butane | 76–80 | 2,430 |

EXAMPLES 12–17

3.3'-Thiodipropionic acid diphenyl ester 9.9 g (0.03 mole), 4,4'-cyclohexylidenebis (2-cyclohexylphenol) 25.9 g (0.06 mole) and sodium methoxide 0.04 g were mixed under nitrogen and reacted at 150° C. for 5 hours

TABLE 1

| STABILIZER No. | DICARBOXYLIC ACID DIPHENYL ESTER | POLYHYDRIC PHENOL | MELTING POINT | MOLECULAR WEIGHT |
|---|---|---|---|---|
| 2 | 3,3'-thiodipropionic acid diphenyl ester | 4,4'-thiobis(3-methyl-6-t-butylphenol) | 90°–97° C. | 3,520 |
| 3 | 3,3'-thiodipropionic acid diphenyl ester | Bisphenol A | 128–135 | 2,480 |
| 4 | Adipic acid diphenyl ester | 4,4'-cyclohexylidene bis(2-cyclohexyl-phenol) | 89–98 | 3,590 |
| 5 | Adipic acid diphenyl ester | 4,4'-isopropylidene bis (2-t-butylphenol) | 110–116 | 3,250 |

EXAMPLES 6–11

1,1,3-tris(2'-methyl-4'-hydroxy-5'-t-butylphenyl) butane 21.8 g (0.04 mol), triethyl amine 10 ml and benzene 90 ml were mixed and thiodipropionic acid dichloride 4.9 g (0.02 mole) added dropwise at room temperature. After the addition, the reaction was continued for 3 hours under reflux and cooled.

An amine hydrochloride precipitated and was filtered after which the benzene solution was washed by water and dried.

A yellow solid product was obtained. Diphenylcarbonate 2.1 g (0.01 mole) and potassium carbonate 0.02 g under reduced pressure (3 mm Hg) while distilling out 5.5 g phenol (98% of calculated quantity). Then, diphenylcarbonate 8.6 g (0.04 mole), cyclohexylidenebis (2-cyclohexylphenol) 8.6 g (0.02 mole) and potassium carbonate 0.05 g were added and reacted at 145° C. for 2.5 hours under reduced pressure (3 mm Hg) while distilling out 4.0 g phenol (101% of the calculated quantity). A glassy solid of m.p. 93°–98° C. and m.w. 4000 was obtained (stabilizer No. 12).

The compounds obtained in the same procedure as Example 12 by varying the dicarboxylic acid diphenylester and polyhydric phenol are shown in Table-3.

TABLE 3

| No. | Dicarboxylic acid Diphenylester | Polyhydric phenol | Melting point | Molecular weight |
|---|---|---|---|---|
| 13 | Succinic acid diphenylester | bisphenol A | 119°–125° C. | 2,180 |
| 14 | Succinic acid diphenylester | 2,2-bis (3'-t-butyl-4'-hydroxyphenyl)-4-(3″,5″-di-t-butyl-4″'-hydroxyl phenyl) butane | 100°–104° C. | 4,820 |
| 15 | thiodipropionic acid diphenylester | 2,2-bis (3'-t-butyl-4'-hydroxyphenyl)-4-(3″,5″-di-t-butyl-4″'-hydroxyl phenyl) butane | 88°–95° C. | 5,010 |
| 16 | adipic acid diphenylester | 4,4'-methylene bis (2-methyl-6-t-butylphenol) | 96°–102° C. | 3,170 |
| 17 | sebacic acid diphenylester | 4,4'-isopropylidene bis (2-t-butylphenol) | 85°–92° C. | 3,340 |

EXAMPLES 18-23

4,4'-Butylidenebis (3-methyl-6-t-butylphenol) 22.9 g (0.06 mole), diphenylcarbonate 6.4 g (0.03 mole) and potassium carbonate 0.03 g were charged and heated to 150° C. under nitrogen. Then, after the reaction of 3 hours in the same temperature, stripping of phenol was carried out for 3 hours under reduced pressure (3 mm Hg) to give 6.1 g phenol or 103% of the calculated quantity. After cooling, benzene 150 ml and triethylamine 10 ml were added and then adipic acid dichloride 3.2 g (0.015 mole) dropwise at room temperature. After the addition, the reaction was continued for 6 hours under reflux, the precipitated amine hydrochloride filtered after cooling and a glassy solid was obtained by distilling out solvent after washing with water and drying. The coester (stabilizer No. 18) had melting point 83°-87° C. and molecular weight 1700.

In the same way, the compounds in Table-4 were obtained by varying the polyhydric phenol and dicarboxylic acid dichloride.

EXAMPLE 28

Thiodipropionic acid dichloride 7.4 g (0.03 mole) was added dropwise to a solution of 4,4'-butylidene-bis (3-methyl-6-t-butylphenol) 22.9 g (0.06 mole), triethyl amine 10 ml and benzene 90 ml at room temperature. After addition, reaction was continued for 3 hours under reflux, the amine hydrochloride filtered off after cooling and the solvent then stripped, Diphenylcarbonate 6.4 g (0.03 mole), 1,1,3-tris (2-methyl-4-hydroxy-5-t-butylphenyl) butane 16.3 g (0.03 mole) and potassium carbonate 0.05 g were added and phenol was stripped out at 145° C. for 3 hours under reduced pressure (3 mm Hg) and another 3 hours to give 5.3 g or 94% of the calculated quantity of phenol. A light yellow glassy solid of m.p. 92°-98° C. and molecular weight 1480 was obtained (stabilizer No. 28).

EXAMPLE 29

Substantially unstabilized polypropylene (Profax 6501, containing a trace of BHT antioxidant to protect

TABLE 4

| Stabilizer No. | Dicarboxylic acid dichloride | Polyhydric phenol | Melting point | Molecular weight |
|---|---|---|---|---|
| 19 | sebacic acid dichloride | 1,1,3-tris (2'-methyl-4'-hydroxy-5'-t-butylphenyl) butane | 78°-84° C. | 2,400 |
| 20 | thiodipropionic acid dichloride | 4,4'-methylenebis (2-methyl-6-t-butylphenol) | 86°-90° C. | 1,560 |
| 21 | succinic acid dichloride | 4,4'-methylenebis (2-methyl-6-t-butylphenol) | 88°-94° C. | 1,500 |
| 22 | sebacic acid dichloride | 4,4'-cyclohexylidenebis (2-cyclohexylphenol) | 90°-95° C. | 1,950 |
| 23 | adipic acid dichloride | 4,4'-thiobis (3-methyl-6-t-butylphenol) | 92°-99° C. | 1,600 |

EXAMPLES 24-27

Sebacic acid diphenylester 7.1 g (0.02 mole), 4,4'-cyclohexylidene diphenol 10.7 g (0.04 mole), and sodium methoxide 0.02 g were reacted at 160° C. for 3 hours under nitrogen atmosphere, then phenol was stripped for 4 hours under reduced pressure (3 mm Hg) giving 3.8 g or 100% of the calculated quantity. Then diphenyl carbonate 17.1 g (0.08 mole), 4,4'-cyclohexylidene bisphenol 18.8 g (0.07 mole) and potassium carbonate 0.05 g were added, reacted for 4 hours and stripped for a further 3 hours under reduced pressure (3 mm Hg) giving 14.4 g or 96% of the calculated quantity of phenol.

A glassy solid of m.p. 131°-137° C. and molecular weight 3500 was obtained (stabilizer No. 24).

The compounds obtained by applying the same procedure to various aliphatic dicarboxylic acids and polyhydric phenols are shown in Table-5.

the polymer during shipment and storage only) 100 parts, distearyl thiodipropionate 0.3 part, and additive test candidate 0.15 part by weight were hand-mixed in a hemispherical bowl and fluxed on a two roll mill at 170° C. for 5 minutes. Samples of each milled sheet were compression molded at 205°±3° C. for 5 minutes to give smooth sheets 0.5 mm in thickness. Strips 10 by 1.5 cm were cut from each molded sheet and exposed lying flat on aluminum foil in an air circulating oven at 150° C. until found to be embrittled and/or visibly degraded. The additive test candidate present in each sample and the observed time to embrittlement and/or visible degradation in the oven at 150° C. are shown in Table-6.

TABLE 6

| Sample | Additive Test Candidate | 150° C. Days to Failure |
|---|---|---|
| Control A | Pentaerythritol tetrakis (3,5-di-t-butyl-4-hydroxy-hydrocinnamate) | 102 |

TABLE 5

| Example No. | Dicarboxylic Acid Diphenylester | Polyhydric Phenol | Melting Point | Molecular Weight |
|---|---|---|---|---|
| 25 | thiodipropionic acid diphenylester | 4,4'-isopropylidene bis (2-t-butylphenol) | 122°-130° C. | 4,690 |
| 26 | adipic acid diphenylester | 2,2'-bis (3'-t-butyl-4'-hydroxphenyl)-4-(3'',5''-di-t-butyl-4''-hydroxyphenyl) butane | 138°-144° C. | 6,590 |
| 27 | sebacic acid diphenylester | bisphenol A | 140°-146° C. | 3,070 |

TABLE 6-continued

| Sample | Additive Test Candidate | 150° C. Days to Failure |
|---|---|---|
| Control B | "PC - 10" commercial polyphenol carbonate | 94 |
| Example 29 | Carbonate/3,3'-thiodipropionate coester of 4,4'-butylidenebis (2-t-butyl-5-methyl-phenol), approx. mol. wt. 1800 | 140 |

The results show that the coester of this invention used in Example 29 is clearly a more effective stabilizer for polypropylene than the additives used in Control A or in Control B. To appreciate the significance of this finding it should be noted that the additive of Control A is widely accepted in industry as the most powerful antioxidant available, and the additive of Control B is described as the most effective of the polycarbonate type stabilizers by D. Plank in the publication "Polycarbonates: A New Concept in Stabilization of Polypropylene". Since all samples contained distearyl thiodipropionate, the enhanced effectiveness of the coester in Example 29 is truly characteristic of the coester structure over and above the well known benefit of combining phenols and thioesters.

EXAMPLES 30 TO 37

Substantially unstabilized polypropylene resin (Profax 6501, containing a trace of BHT antioxidant to protect the polymer during shipment and a storage only) 100 parts by weight, dilaurylthiodipropionate 0.2 part by weight, and polyhydric phenol dicarboxylate-carbonate coester 0.2 part by weight were mixed for ten minutes by mixing and grinding at room temperature and milled and molded to make a sheet of 1.0 mm in thickness at 180° C. and 200 kg/cm$^2$ for 5 minutes. This sheet was cut into ten sample pieces of 10×20 mm of each formulation, and exposed on aluminum foil in a Geer air-circulating oven at 160° C. for heat stability examination. The time to the beginning of degradation was taken as the time when more than five sample pieces in ten of each formulation were discolored and brittle. The stabilizer ingredients used and the results obtained are shown in Table 7.

TABLE 7

| No. | Stabilizer | Deterioration Beginning Time | Steeped in hot water |
|---|---|---|---|
| Control C | 4,4'-n-butylidenebis(3-methyl-6-t-butylphenol) | 530 hours | 270 hours |
| D | NONE | 120 | 95 |
| Example | Polyhydric phenol coester | | |
| 30 | No. 1 | 1,260 | 1,130 |
| 31 | No. 4 | 1,100 | 1,040 |
| 32 | No. 7 | 1,250 | 1,150 |
| 33 | No. 10 | 1,230 | 1,090 |
| 34 | No. 14 | 1,290 | 1,200 |
| 35 | No. 19 | 1,210 | 1,180 |
| 36 | No. 21 | 1,170 | 1,050 |
| 37 | No. 25 | 1,320 | 1,260 |

Each of the polypropylene samples of Examples 30 through 37 stabilized according to this invention with a coester of carbonic acid and an aliphatic dicarboxylic acid with a polyhydric phenol had when freshly prepared at least double the heat stability of a control composition containing a conventional phenolic stabilizer along with the same dilauryl thiodipropionate synergist, used in Examples 1 through 8. After the 7 day immersion test in hot water the difference was even more dramatic. The samples of Examples 30 through 37 stabilized according to this invention had substantially retained their heat stability while the control composition had retained only about one half the original heat stability.

EXAMPLES 38 TO 45

Stabilized polyethylene resin (Hi-Zex 5100E, Mitsui Petrochemical Industries, Ltd. Japan) 100 parts by weight and a polyhydric phenol dicarboxylate-carbonate coester 0.15 part by weight were milled on a two roll mill for 5 minutes at 150° C. and then molded into a sheet of 1.2 mm thickness by compression molding at 150° C. and 180 kg/cm$^2$ for 5 minutes. The sheet was cut into sample pieces of 10×20 mm and tested for heat stability in the Geer oven at 148.5° C. in air on aluminum foil. The time to the beginning of degradation was taken as the time when more than five sample pieces in ten of each formulation were discolored and brittle. The stabilizer ingredients used and the results obtained are shown in Table 8.

TABLE 8

| No. | STABILIZER | Deterioration Beginning Time |
|---|---|---|
| Control E | 1,1,3-tris(2'methyl-4'-hydroxy-5'-t-butylphenyl) butane | 310 hours |
| F | NONE | 186 |
| Example | Polyhydric phenol coester | |
| 38 | No. 3 | 427 |
| 39 | No. 6 | 454 |
| 40 | No. 11 | 436 |
| 41 | No. 15 | 450 |
| 42 | No. 18 | 413 |
| 43 | No. 23 | 409 |
| 44 | No. 26 | 420 |
| 45 | No. 28 | 433 |

Each of the polyethylene samples of Examples 38 through 45 stabilized according to this invention with a coester of carbonic acid and an aliphatic dicarboxylic acid with a polyhydric phenol had at least 32% greater heat stability than a control sample stabilized instead with a known polyhydric phenol.

EXAMPLES 46 to 53

ABS resin (Blendex 111) 100 parts by weight, Zinc stearate 0.5 part by weight, titanium oxide 5.0 parts by weight, and a polyhydric phenol dicarboxylate-carbonate coester 0.5 part by weight were mixed by grinding at room temperature for 10 minutes.

The compound was prepared by extruding the ground mixture using a 30 mm extruder at 30 rpm and 240° C. A sheet of 0.5 mm thickness was prepared by compression molding each extruded compound at 200 kg/cm$^2$ and 180° C. for 5 minutes. Each molded sheet was cut to the size of 40×150 mm, and suspended in an individual glass cylinder.

Each cylinder was set in an air circulating oven at 140° C., flushed with pure oxygen, the pressure adjusted to one atmosphere, and the cyclinder fitted with a closed end manometer. The time to beginning of oxidation-degradation was read by recording the time when the pressure in the cylinder diminished rapidly. The ingredients of the stabilizer combination used in each example and the results observed are shown in Table 9.

TABLE 9

| No. | STABILIZER | DETERIORATION BEGINNING TIME |
|---|---|---|
| Control | | |
| G | None | 160 minutes |
| H | 4,4'-thiobis(3-methyl-6-t-butylphenol) | 240 |
| Example | Polyhydricphenol coester | |
| 46 | No. 2 | 590 |
| 47 | No. 9 | 520 |
| 48 | No. 10 | 530 |
| 49 | No. 13 | 480 |
| 50 | No. 17 | 500 minutes |
| 51 | No. 23 | 570 |
| 52 | No. 24 | 580 |
| 53 | No. 27 | 510 |

Each of the ABS polymer samples of Examples 46 through 53 stabilized according to this invention with a coester of carbonic acid and an aliphatic dicarboxylic acid with a polyhydric phenol had at least double the heat stability of a control sample stabilized with the same zinc stearate as in Examples 46 through 53 along with a conventional polyhydric phenol stabilizer.

EXAMPLES 54 TO 61

A clear sheet was prepared by kneading polyvinylchloride resin (Geon 103EP) 100 parts, dioctylphthalate 42 parts, epoxidized soybean oil 3 parts, zinc stearate 0.3 part, barium stearate 0.5 part, stearic acid 0.3 part, and a polyhydric phenol dicarboxylate-carbonate coester 0.3 part on a two roll mill at 175° C. for 5 minutes and then compression molding at 175° C. Then, a heat stability test was carried out in a Geer oven at 190° C. in an air atmosphere. The time to degradation was determined by the discoloration observed. The polyhydric phenol coester used and the results obtained are shown in Table 10.

TABLE 10

| No. | STABILIZER | BEGINNING TIME OF DETERIORATION | |
|---|---|---|---|
| | | Yellowed | Blackened |
| Control | | | |
| I | None | 30 min. | 45 min. |
| J | BHT | 35 | 50 |
| Example | Polyhydric phenol coester | | |
| 54 | No. 3 | 55 | 75 |
| 55 | No. 8 | 50 | 70 |
| 56 | No. 12 | 65 | 85 |
| 57 | No. 16 | 60 | 75 |
| 58 | No. 19 | 60 | 75 |
| 59 | No. 21 | 65 | 80 |
| 60 | No. 25 | 70 | 90 |
| 61 | No. 26 | 65 | 85 |

Each of the polyvinyl chloride samples of Examples 54 through 61 stabilized according to this invention with a coester of carbonic acid and an aliphatic dicarboxylic acid with a polyhydric phenol, along with epoxidized soybean oil, zinc stearate, and barium stearate, had at least 55% greater heat stability than a control sample containing a conventional hindered phenol along with the same epoxidized soybean oil, zinc stearate, and barium stearate.

EXAMPLE 62 TO 69

100 parts of nylon 66 delustered by adding 0.05% of titanium dioxide was dissolved in 90 parts of 90% formic acid, and 1.0 part of a polyhydric phenol dicarboxylate-carbonate coester was added and mixed completely. The solution was flowed uniformly on a glass plate, and dried in a heated air oven at 105° C. for 10 minutes to prepare a film. The color of the film, after being heated in an air oven at 225° C. for 30 minutes, was measured and shown in Table 11 along with the compounds present in each formulation.

TABLE 11

| No. | Stabilizer | Color of Sheet |
|---|---|---|
| Control | | |
| K | None | dark brown |
| L | 4,4'-cyclohexylidene bisphenol | brown |
| Example | Polyhydricphenol coester | |
| 62 | No. 4 | light yellow |
| 63 | No. 7 | " |
| 64 | No. 15 | " |
| 65 | No. 17 | " |
| 66 | No. 18 | " |
| 67 | No. 22 | " |
| 68 | No. 24 | " |
| 69 | No. 27 | Yellow |

Each of the nylon samples of Example 62 through 69 stabilized according to this invention with a coester of carbonic acid and an aliphatic dicarboxylic acid with a polyhydric phenol gave a much lighter colored film than control samples containing instead of the coester according to this invention a conventional polyhydric phenol stabilizer or no stabilizer.

EXAMPLE 70 TO 77

In order to examine the effect of the stabilizer according to this invention on polybutene resin, a sheet of 1 mm in thickness was prepared by kneading the following formulation on a two roll mill and then compression molding at 160° C. and 200 kg/cm² for 5 minutes. The sheet obtained was cut to the size of 40×150 mm, and tested for heat stability in glass cylinders containing pure oxygen at 1 atmosphere pressure as in Example 46 to 53, except that the test temperature was 160° C.

| (Formulation) | |
|---|---|
| Un-stabilized poly-1-butene resin | 100 parts by weight |
| Calcium stearate | 1.0 |
| Distearylthiodipropionate | 0.2 |
| Polyhydric phenol dicarboxylate-carbonate coester | 0.2 |

The results are shown in Table 12. The time to beginning of oxidation degradation was read by recording the time when the pressure in the cylinder diminished rapidly.

TABLE 12

| No. | Stabilizer | Deterioration Beginning Time |
|---|---|---|
| Control | | |
| M | BHT | 105 hrs |
| N | 4,4-butylidenebis (3-methyl-6-t-butylphenol) | 230 |
| Example | Polyhydric phenol coester | |
| 70 | No. 1 | 565 |
| 71 | No. 5 | 520 |
| 72 | No. 8 | 485 |
| 73 | No. 12 | 535 |
| 74 | No. 16 | 510 |
| 75 | No. 20 | 525 |

TABLE 12-continued

| No. | Stabilizer | Deterioration Beginning Time |
|---|---|---|
| 76 | No. 22 | 495 |
| 77 | No. 28 | 540 |

Each of the polybutene samples of Example 70 through 77 stabilized according to this invention with a coester of carbonic acid and an aliphatic dicarboxylic acid with a polyhydric phenol had at least double the heat stability of a control sample stabilizer with the same distearylthiodipropionate and calcium stearate as in Example 70 through 77 along with a conventional polyhydric phenol stabilizer.

EXAMPLE 78 TO 85

In order to examine the effects of the coesters according to this invention in ethylene-vinylacetate copolymer, samples were prepared according to the following formulation and tested for heat stability in a Geer oven at 175° C. and initial color was measured for yellowness using the Hunter color difference meter, greater numbers indicating more severe discoloration. The results are shown in Table 13. The heat stability is expressed in minutes of heating in the oven until a red or brown discoloration was observed.

| (Formulation) | |
|---|---|
| Ethylene-Vinylacetate copolymer resin | 100 parts |
| Montan wax ester lubricant | 0.3 |
| Polyhydric phenol dicarboxylate-carbonate coester | 0.1 |

TABLE 13

| No. | Sample Compound | Heat Stability | Initial Color |
|---|---|---|---|
| Control | Stabilizer | | |
| 0 | None | 75 min | 33 |
| P | 4,4-butylidenebis (3-methyl-6-t-butyl-phenol) | 90 | 26 |
| Example | polyhydric phenol coester | | |
| 78 | No. 1 | 150 | 9 |
| 79 | No. 5 | 120 | 11 |
| 80 | No. 6 | 120 | 10 |
| 81 | No. 9 | 135 | 10 |
| 82 | No. 14 | 150 | 12 |
| 83 | No. 18 | 150 | 10 |
| 84 | No. 20 | 135 | 9 |
| 85 | No. 28 | 150 | 11 |

Each of the ethylene-vinylacetate copolymer samples of Example 78 through 85 stabilized according to this invention with a coester of carbonic acid and an aliphatic dicarboxylic acid with a polyhydric phenol had much lighter initial color and at least 33% greater heat stability than a control sample stabilized with a conventional polyhydric phenol.

EXAMPLES 86 TO 93

The stabilizer combinations according to this invention have an excellent stabilizing effect on crosslinked polyethylene. Unstabilized low density polyethylene(meltindex 2.0) 100 parts by weight, dilaurylthiodipropionate 0.2 part by weight, and a polyhydric phenol dicarboxylic acid and carbonate coester 0.2 part by weight were mixed by milling on a two roll mill at 110° C. for 10 minutes and then dicumyl peroxide (Percumyl D, Nippon Oil and Fats Co., Ltd.) 2.0 parts by weight was added and further kneaded at the same temperature for two minutes. This sheet prepared on the mill was compression molded at 110° C. and 100 kg/cm² for 5 minutes, then rapidly heated up to 180° C. while maintaining the pressure at 100 kg/cm² for 15 minutes. The sheet obtained was cut to the size of 40×150 mm, hung in a Geer oven and tested for heat stability in air at 160° C. The degradation time was judged by looking for the time when more than 50% of pieces were discolored or deformed. The stabilizers ingredients used and the results obtained are shown in Table 14.

TABLE 14

| No. | Sample Compound | Beginning Time of Aging |
|---|---|---|
| Control | Stabilizer | |
| Q | BHT | 32 hrs |
| R | 4,4-thiobis(3-methyl-6-t butylphenol) | 104 |
| Example | Polyhydricphenol coester | |
| 86 | No. 2 | 185 |
| 87 | No. 8 | 164 |
| 88 | No. 10 | 177 |
| 89 | No. 11 | 169 |
| 90 | No. 13 | 152 |
| 91 | No. 23 | 180 |
| 92 | No. 25 | 175 |
| 93 | No. 26 | 171 |

Each of the cross-linked polyethylene samples of Example 86 through 93 stabilized according to this invention with a coester of carbonic acid and an aliphatic dicarboxylic acid withh a polyhydric phenol had at least 46% greater heat stability than a control sample stabilized with a conventional polyhydric phenol.

We claim:

1. A stabilized synthetic resin composition comprising a synthetic resin and 0.01 to 5% by weight of the resin of a coester, having a molecular weight between 700 and about 10,000 measured by a vapor pressure method, of at least one polyhydric phenol, having 2 to 3 phenolic hydroxyl groups and 1 to 3 benzenoid rings, with carbonic acid and an aliphatic dicarboxylic acid having 4 to 10 carbon atoms and not more than one thioether sulfur atom, in which the molar proportions of carbonic acid to aliphatic dicarboxylic acid range from 19:1 to 1:19.

2. A stabilized synthetic resin composition according to claim 1 in which the coester has a molecular weight between 1200 and about 7000.

3. A stabilized synthetic resin composition according to claim 1 in which the aliphatic carboxylic acid of the coester is succinic acid.

4. A stabilized synthetic resin composition according to claim 1 in which the aliphatic dicarboxylic acid of the coester is adipic acid.

5. A stabilized synthetic resin composition according to claim 1 in which the aliphatic dicarboxylic acid of the coester is sebacic acid.

6. A stabilized synthetic resin composition according to claim 1 in which the aliphatic dicarboxylic acid of the coester is 3,3'-thiodipropionic acid.

7. A stabilized synthetic resin composition according to claim 1 in which the polyhydric phenol of the coester has 3 benzenoid rings in the molecule.

8. A stabilized synthetic resin composition according to claim 1 in which the polyhydric phenol of the coester is an alkylidene-bisphenol.

9. A stabilized synthetic resin composition according to claim 1 in which the polyhydric phenol of the coester is a bisphenol with two benzenoid rings linked through sulfur.

10. A stabilized synthetic resin composition according to claim 1 in which the coester has the formula:

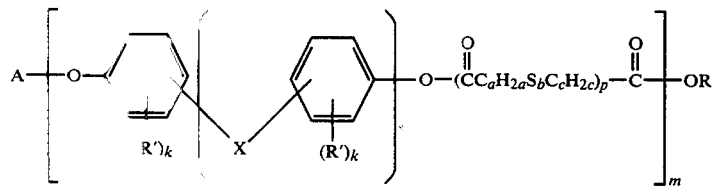

in which independently at each occurrence R' is selected from the group consisting of alkyl having one to 10 carbon atoms, cycloalkyl having 5 to 10 carbon atoms and alkylcycloalkyl having 6 to 10 carbon atoms, A is selected from the group consisting of hydrogen and

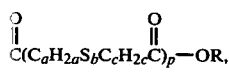

R is selected from the group consisting of alkyl, aryl, and

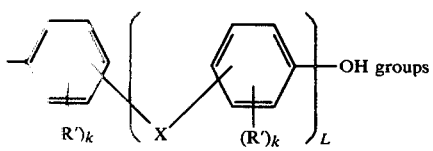

X is selected from the group consisting of

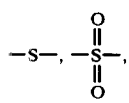

—CH$_2$SCH$_2$, —O—, a single bond, a divalent hydrocarbon radical, and

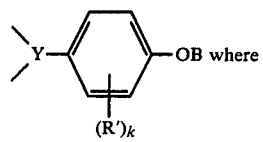

Y is a trivalent hydrocarbon radical, B is selected from the group consisting of hydrogen and

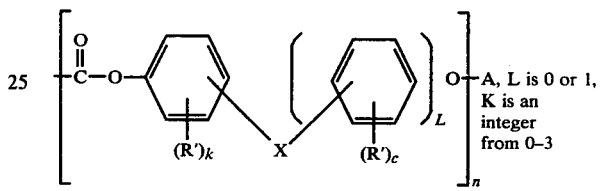

L is 0 or 1, K is an integer from 0–5
m is 2 to about 20, n is an average of 0.1 to about 20, a and c are integers from 1 to 7, b is 0 or 1, and p is 0 or 1 provided that in at least one occurrence p is 1 and in at least one occurrence p is 0.

11. A stabilized synthetic resin composition according to claim 1, comprising as an additional ingredient at least one synthetic resin stabilizers selected from the group consisting of thiodipropionate esters, 1,2-epoxides, organic phosphites, polyhydric alcohols, polyhydric alcohol 3-alkyl thiopropionic acid esters, ultraviolet absorbers, heavy metal deactivators and barium, magnesium, nickel, strontium, tin and zinc salts of monocarboxylic acids having 6 to 24 carbon atoms.

12. A stabilized synthetic resin composition according to claim 11 in which the added synthetic resin stabilizer is a thiodipropionate ester.

13. A stabilizer composition according to claim 11 in which the added synthetic resin stabilizer is a 1,2-epoxide.

14. A stabilized synthetic resin composition according to claim 1 in which the synthetic resin is selected from the group consisting of olefin polymers.

15. A stabilized synthetic resin composition according to claim 1 in which the synthetic resin is polyvinyl chloride.

16. A stabilized synthetic resin composition according to claim 1 in which the synthetic resin is an acrylnitrile-butadiene-styrene polymer.

* * * * *